US009047238B2

(12) United States Patent
Zaslavsky et al.

(10) Patent No.: US 9,047,238 B2
(45) Date of Patent: Jun. 2, 2015

(54) CREATING A VIRTUAL MACHINE FROM A SNAPSHOT

(71) Applicant: Red Hat Israel, Ltd., Raanana (IL)

(72) Inventors: Yair Zaslavsky, Netanya (IL); Omer Frenkel, Tel Aviv (IL); Mike Kolesnik, Ramat-Gan (IL)

(73) Assignee: Red Hat Israel, Ltd., Raanana (IL)

( * ) Notice: Subject to any disclaimer, the term of this patent is extended or adjusted under 35 U.S.C. 154(b) by 136 days.

(21) Appl. No.: 13/687,475

(22) Filed: Nov. 28, 2012

(65) Prior Publication Data

US 2014/0149695 A1    May 29, 2014

(51) Int. Cl.
| | | |
|---|---|---|
| G06F 11/00 | (2006.01) | |
| G06F 12/16 | (2006.01) | |
| G06F 9/455 | (2006.01) | |
| G06F 11/14 | (2006.01) | |

(52) U.S. Cl.
CPC ............... G06F 12/16 (2013.01); G06F 9/455 (2013.01); *G06F 11/1438* (2013.01); G06F 11/1451 (2013.01); *G06F 11/1461* (2013.01); *G06F 2201/815* (2013.01); G06F 9/45558 (2013.01); *G06F 2009/45562* (2013.01)

(58) Field of Classification Search
CPC .................. G06F 2201/84; G06F 2009/45562; G06F 2009/4557; G06F 3/065
USPC .......................................................... 714/6.3
See application file for complete search history.

(56) References Cited

U.S. PATENT DOCUMENTS

| | | | |
|---|---|---|---|
| 8,364,639 B1 * | 1/2013 | Koryakina et al. ........... 707/639 |
| 8,621,274 B1 * | 12/2013 | Forgette et al. ................. 714/10 |
| 2005/0114614 A1 | 5/2005 | Anderson et al. |
| 2006/0085784 A1 * | 4/2006 | Traut et al. ......................... 718/1 |
| 2009/0222632 A1 | 9/2009 | Sasage et al. |
| 2012/0060006 A1 | 3/2012 | Paterson-Jones et al. |
| 2012/0144391 A1 * | 6/2012 | Ueda ................................. 718/1 |
| 2012/0173824 A1 | 7/2012 | Iyigun et al. |
| 2012/0303902 A1 | 11/2012 | Butterworth et al. |
| 2013/0046948 A1 | 2/2013 | Vaghani et al. |
| 2013/0054533 A1 | 2/2013 | Hao et al. |
| 2013/0055249 A1 | 2/2013 | Vaghani et al. |
| 2014/0095817 A1 | 4/2014 | Hsu et al. |

* cited by examiner

*Primary Examiner* — Jigar Patel
(74) *Attorney, Agent, or Firm* — Lowenstein Sandler LLP

(57) ABSTRACT

A computer system generates a clone of a virtual machine from a point-in-time snapshot backup by collapsing metadata snapshots and storage snapshots into a virtual machine image. The computer system identifies a clone request for a virtual machine, the clone request comprising a point-in-time reference, retrieves at least one metadata snapshot and at least one storage snapshot based on the point-in-time reference, combines the at least one metadata snapshot and the at least one storage snapshot into a virtual machine image, and provisions a new virtual machine based on the virtual machine image.

12 Claims, 5 Drawing Sheets

CREATING A VIRTUAL MACHINE FROM A SNAPSHOT

TECHNICAL FIELD

The embodiments of the disclosure relate generally to virtual machines and, more specifically, relate to a mechanism for generating a clone of a virtual machine by collapsing one or more snapshots into a virtual disk.

BACKGROUND

Distributed computing is the use of computing resources (hardware and software) that are delivered as a service over a network (typically the Internet), often referred to as "cloud computing." In a distributed computing environment, a customer pays a "cloud provider" to execute a program on computer hardware owned and/or controlled by the cloud provider. It is common for cloud providers to make virtual machines hosted on its computer hardware available to customers for this purpose. Virtual machines are software implementations of a physical device than can execute programs in a manner equivalent to the physical device.

The cloud provider typically provides an interface that a customer can use to manage virtual machines and associated resources such as processors, storage, and network services, etc. The interface also allows the customer to install and execute programs, and to request backups and restorations of virtual machines. It may be desirable to clone the data and state of the virtual machine; however, such backups can be time consuming.

BRIEF DESCRIPTION OF THE DRAWINGS

Embodiments of the disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for creating a virtual machine image from snapshots of virtual machine configuration information or metadata, and snapshots of virtual machine storage devices. In embodiments of the disclosure, a computer system generates a new virtual machine, or a clone, based on a virtual machine from a point-in-time snapshot backup by collapsing metadata snapshots and storage snapshots, which may be stored separately, into a virtual machine image. A snapshot backup, as used herein, refers to a combination of a metadata snapshot and a storage snapshot. A metadata snapshot may be associated with a storage snapshot via a unique identifier. The unique identifier, in one embodiment, is a timestamp generated at the time the metadata snapshot and the storage snapshot are created.

The computer system identifies a clone request for a virtual machine, the clone request comprising a point-in-time reference, retrieves at least one metadata snapshot and at least one storage snapshot based on the point-in-time reference, combines the at least one metadata snapshot and the at least one storage snapshot into a virtual machine image, and provisions a new virtual machine based on the virtual machine image. The disclosure beneficially allows for the creation of a new virtual machine based on a point-in-time backup of an existing virtual machine. Additionally, embodiments enable virtual machines to be cloned while they are running.

Figure 1:
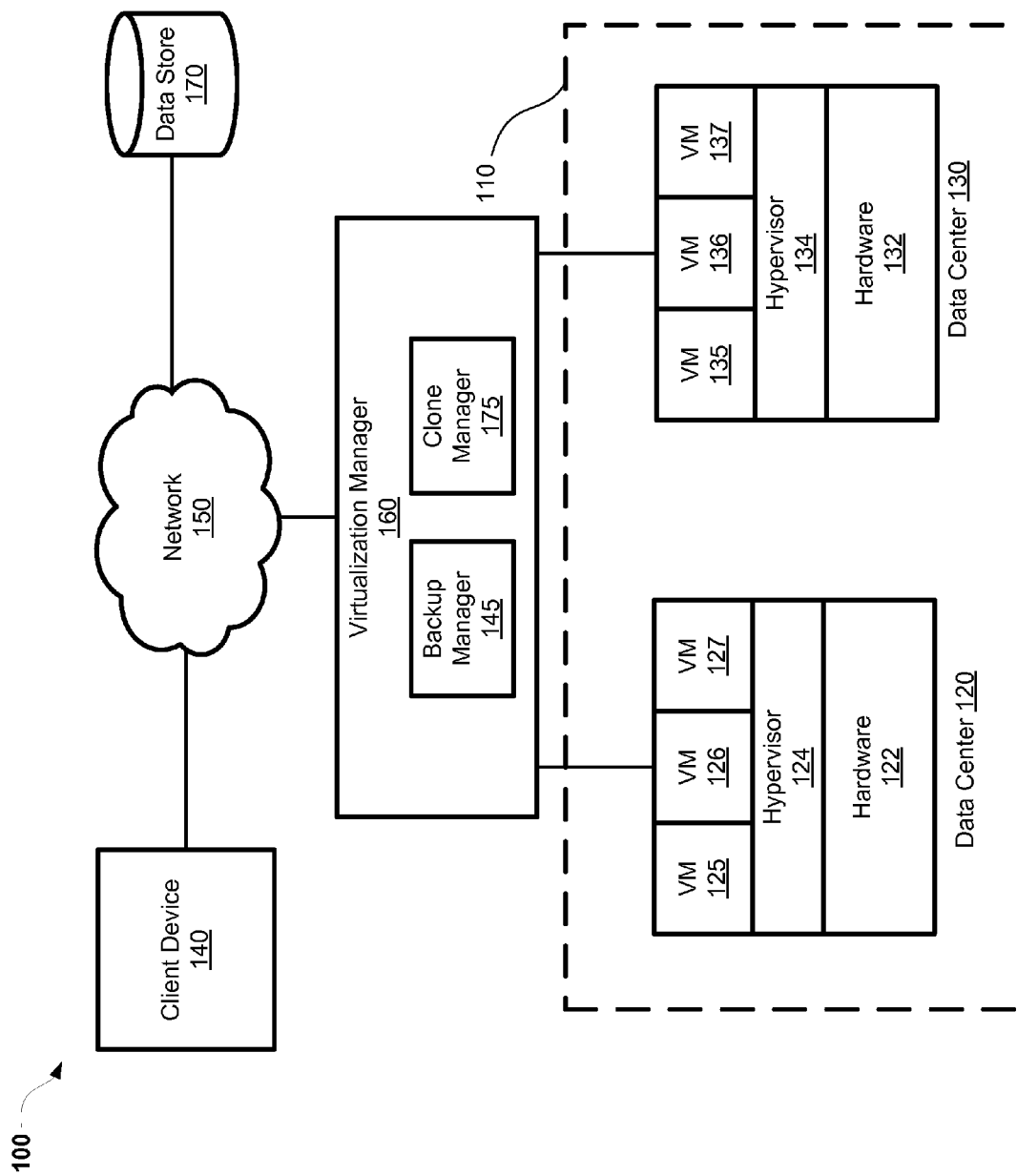
FIG. 1 is a block diagram of a network environment for implementing a virtualization manager according to one embodiment of the present disclosure.

FIG. 1 is a block diagram of a network architecture 100, in which embodiments of the disclosure may operate. The network architecture 100 includes a virtualization infrastructure 110 of an organization that spans multiple data centers. For simplicity, only two data centers are shown. Data center 120 may be located in one geographic area (for example Europe) and data center 130 may be located in another geographic area (for example East Coast USA).

Data center 120 includes various hardware resources 122, such as physical servers and various processing and communications resources. The virtualization infrastructure 110 can include various servers and controllers not shown for simplicity (such as a distributed resource (e.g., cloud) controller, a provisioning server, etc) that enable the virtualization infrastructure 110 to deploy a hypervisor 124 on one or more of the hardware resources 122 and to deploy virtual machines 125-127 using the hypervisor 124 (also known as a virtual machine monitor (VMM)).

In one embodiment, hypervisor 124 is a component of a host operating system (OS). Alternatively, the hypervisor 124 may run on top of a host OS, or may run directly on host hardware without the use of a host OS. The hypervisor 124, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 124 presents to other software (i.e., "guest" software) the abstraction of one or more virtual machines (VMs).

Data center 130 can be implemented in a manner similar to data center 120. For example, data center 130 may include one or more hypervisors 134 running on hardware resources 132. Such hardware resources 132 may represent hardware resources of multiple host machines arranged in a cluster. Each hypervisor may manage one or more virtual machines. For example, hypervisor 134 may deploy and manage virtual machines 135, 136, 137.

The virtualization infrastructure 110 can be used to provide various composite services (also known as composite applications). A composite application is an application that is installed on multiple machines (e.g., on multiple virtual machines). In the case of virtual machines, the virtual machines may all run on the same data center 120, 130, or may run on different data centers at different geographic locations. Each component of the application may be installed on a virtual machine optimized for the component.

In one embodiment, a single component of the composite application is part of a virtual appliance. A virtual appliance may be a virtual machine image file that includes a preconfigured operating system environment and a single application (e.g., a component of the composite application). The virtual appliance may simplify the delivery, setup and operation of that single application. The virtual appliance may be a subset of a virtual machine. Virtual appliances may be used for deploying network applications, such as firewalls, virtual private networks, wide area network (WAN) optimizers, web servers, application servers, database management systems, and so forth.

The composite application and its components may be made up of several software "applications," so the composite application will sometimes be referred to as a composite service. For example, a composite application or service can be a Web application, such as a news site, a social networking site, or a blog site. Such a composite application can have various components. For example, a 3-tier application will have an interface tier (Web server), a business logic tier (application server) and a data tier (database management system). Various other tiers are possible, including an orchestration tier to distribute and manage jobs between multiple servers.

For example, a composite service may consist of a database server hosted—in data center 120—on virtual machine 125, an application server hosted on virtual machine 126, and a web server hosted on virtual machine 127. In data center 130, another application server for the composite service can be hosted on virtual machine 135 and another web server for the composite service can be hosted on virtual machine 136. In another example, data center 120 may host a virtual appliance associated with a composite application (e.g., an application server of the composite application), and data center 130 may host a second virtual appliance associated with the composite application (e.g., a web server of the composite application).

In one embodiment, a client 140 is connected to the virtualization infrastructure—and ultimately to the virtual machines—via a network 150, which may be a private network (e.g., a local area network (LAN), a wide area network (WAN), intranet, or other similar private networks) or a public network (e.g., the Internet). The client 140 may be a mobile device, a PDA, a laptop, a desktop computer, or any other computing device.

In one embodiment, the virtualization infrastructure 110 also includes, or in the alternative, communicates with a virtualization manager 160. The virtualization manager 160 monitors operating parameters of the data centers 120, 130, including performance metrics of each individual virtual machine host (e.g., hardware 122) executing as part of the data center 120. Examples of operating parameters for the data center can include, but are not limited to, number of host machines, total number of processing cores, network bandwidth capability, power usage, reliability (e.g., uptime), storage capacity, etc. As part of maintaining the operating parameters of the data centers, the virtualization manager 160 is also configured to maintain the performance metrics of each host, which may include, but is not limited to, number of physical processors, RAM capacity, physical storage capacity, number of virtual processors, virtual RAM capacity, virtual storage capacity, quantity and type of physical and virtual network interfaces, number of virtual machines currently executing on the host, and processor and memory usage by the virtual machines.

The virtualization manager 160, in one embodiment, maintains information on characteristics of all virtual environments and underlying hardware and software in those virtual environments that it interacts with. This may include information on underlying hardware (e.g., processor resources, memory resources, etc.), information on a host operating system, information on a hypervisor, information on virtual machines, and so forth. Each virtual machine or component of a composite application (e.g., each virtual appliance) may specify configuration parameters, such as minimum resources, a type of hypervisor that it will function on, and so forth.

As discussed above, virtualization manager 160 may interact with a virtual environment that spans multiple different data centers 120, 130, and may additionally interact with multiple different virtualization environments. For example, the virtualization manager 160 may interact with a first virtualization environment that uses an underlying hypervisor provided by VMWare®, and with a second virtualization environment that uses an underlying hypervisor provided by Red Hat®, or Raleigh, N.C. The virtualization manager 160 maintains information on the underlying software and hardware in each such virtualization environment.

The virtualization manager 160, in one embodiment, includes a backup manager 145. The backup manager 145 is configured to initiate snapshot backups of any virtual machine hosted in the virtualization infrastructure 110. A snapshot refers to saving a point-in-time backup of a virtual machine. In one embodiment, the snapshot backup refers to a metadata backup and a storage backup. Accordingly, the backup manager 145 is configured to initiate the metadata backup and the storage backup. The backup manager 145 may store the metadata backup separately from the storage backup. The metadata backup and the storage backup are described in greater detail below with reference to FIG. 2. The snapshot may be in the form of a virtual machine image, and include the state of the virtual machine (e.g., paused, hibernated, active, etc.) together with an accounting of the resources of the host (e.g., hardware 122) utilized by the virtual machine (e.g., VM 125). The storage snapshot of the virtual machine, in one embodiment, may also include copies of all virtual storage devices (e.g., virtual hard disk, virtual RAM, virtual removable storage, etc.). The metadata snapshot includes information that may be referred to as the metadata of the virtual machine. Examples of metadata include, but are not limited to, processor or other hardware logs, processor state, hardware state, memory state, physical storage usage, devices (physical or virtual) in use by the virtual machine, current configuration information (e.g., any data, instructions, scripts, or other information used by a hardware device or hypervisor 124 to implement the virtual machine) of the virtual machine, etc.

The backup manager 145 is configured to instruct the hypervisor 124 to create and maintain the storage backups, or copies of the virtual storage devices. The backup manager 145, in one embodiment, maintains a chain of metadata snapshots in the data store 170, which may be implemented in the virtualization manage 160, or separately in a location accessible by the virtualization manager 160. The backup manager 145 is also configured for managing the backup schedule of the virtual machines (e.g., VM 125, 126, 127). The backup manager 145 may initiate backups based on a schedule that indicates times, such as particular weeks, days, hours, or a schedule that based on the passage of time (e.g., schedule a backup every hour). The schedule may be defined by a user, or alternatively, predefined as a default schedule. In another embodiment, the backup manager 145 may be configured to receive a request, via the network 150, from the client device 140. The request may indicate that the backup manager 145 is to initiate a backup of a particular virtual machine. Alternatively, the backup manager 145 may receive an instruction from another component of the virtualization manager 160, or another device, to initiate a backup. For example, the backup manager 145 may receive an indication from data center 130 that a web server operating on VM 135 is overloaded with traffic, and therefore, the backup manager 145 should initiate a backup event of VM 135 . . . .

The backup manager 145 is configured to perform, or provide instructions to the hypervisor to perform incremental backups. An incremental backup refers to creating a backup of only the portions of the virtual machine that have changed since the previous backup. Stated differently, the backup manager 145 is configured to initiate a storage snapshot backup that, in one embodiment, saves a differentiation of virtual images of the storage devices from the most recent snapshot. For example, the backup manager 145 is configured to compare the current backup operation to the most recent backup operation, and store only the portions of the virtual machine that have changed, as will be described in greater detail below with reference to FIG. 2.

In one embodiment, the data store 170 is a relational database where every metadata snapshot taken of a virtual machine is maintained as a record in the database. The metadata snapshots may be stored in the data store 170 with an identifier that distinguishes one snapshot from another. In one example, the identifier is a time stamp indicative of the date and time when the snapshot was created by the backup manager 145. Another example of an identifier may include an identifier that indicates a type of maintenance performed to the virtual machine. For example, a snapshot that is created when a software update is applied may have an identifier that is indicative of the software update. The identifier associates a point-in-time metadata snapshot with a storage snapshot that is stored separately from the metadata snapshot. Accordingly, when a clone request, or new virtual machine request, is received, the metadata snapshot together with the associated storage snapshot may be combined into a new virtual machine image as will be discussed below in greater detail.

The virtualization manager 160 also includes a clone manager 175. The clone manager is configured to create a clone, or new virtual machine, of a virtual machine by combining a metadata snapshot from the data store 170 with a storage snapshot. The clone manager 175 instructs the hypervisor, or a virtual desktop and server management daemon (e.g., a daemon operating on a host machine), to "collapse" the snapshots into a virtual machine image. In one embodiment, the clone manager 175 is configured to provide a user interface to the client device 140 so that a user may interact with the clone manager 175 to select a desired point-in-time metadata snapshot and storage snapshot. The user interface may be a command-line interface or a graphical user interface. In a further embodiment, the clone manager 175 is configured to instruct the hypervisor 124 to collapse one or more storage snapshots into a virtual machine image with a corresponding metadata snapshot.

While various embodiments are described in terms of the environment described above, the facilities and systems may be implemented in a variety of other environments and combinations. For example, the backup manager 145 may be hosted by a virtual machine of the virtualization infrastructure 110.

Figure 2:
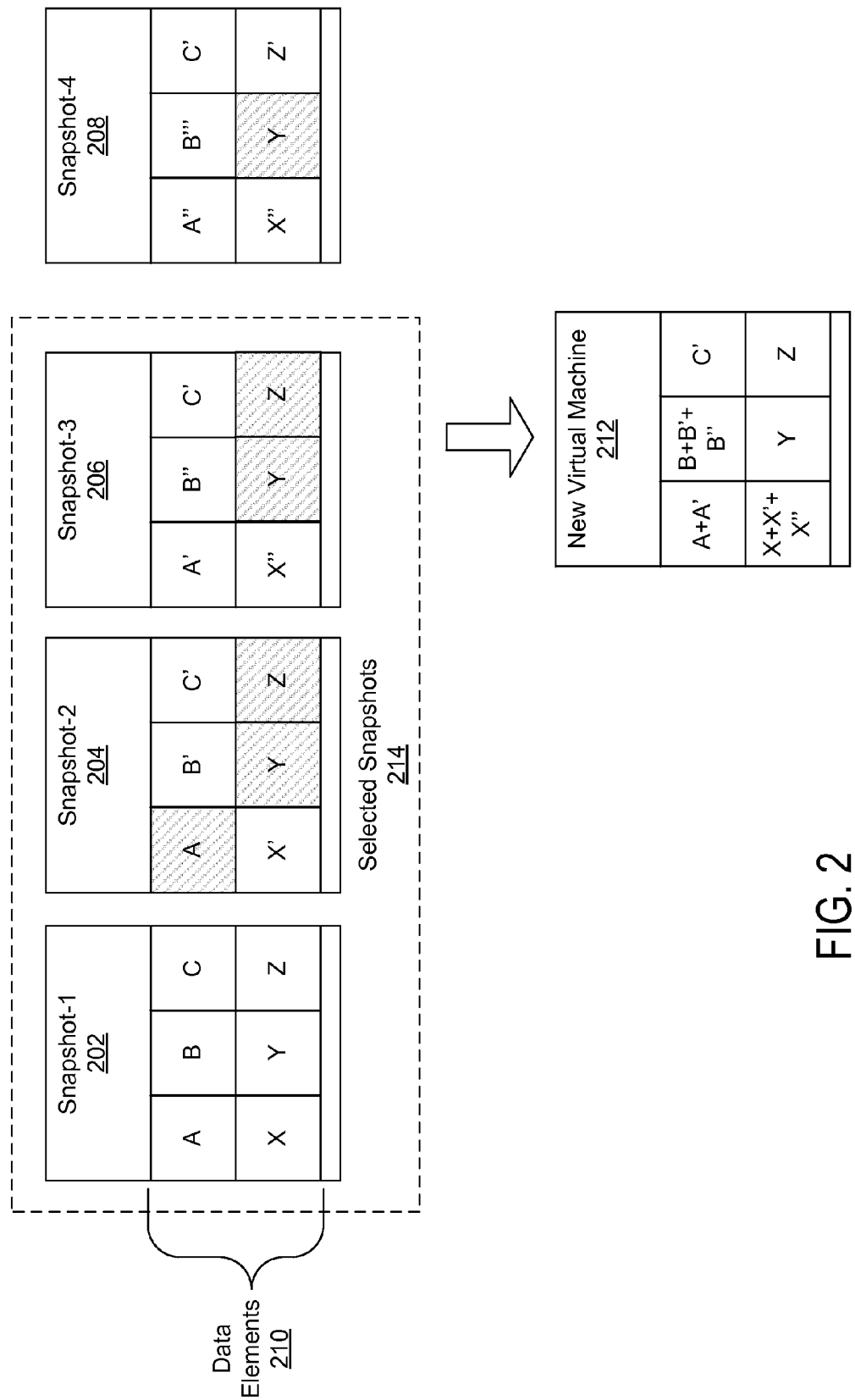
FIG. 2 is a graphical representation of collapsing one or more snapshots into a virtual machine image.

FIG. 2 is a graphical representation of collapsing one or more storage snapshots into a virtual machine image. As described above, the backup manager 145 is configured to generate snapshots of a virtual machine. The snapshots (e.g., snapshot 202, 204, 206, 208), as depicted, represent a metadata snapshot and a storage snapshot. Although as described above, the metadata snapshot may be stored separately from the storage snapshot, in other embodiments, the metadata may be combined with the storage snapshot into a single image snapshot. FIG. 2 illustrates a "chain" of backup snapshots 202-208. The chain of snapshots 202-208 represent a snapshots that are sequentially generated by the backup manager 145.

The snapshots 202-208 may represent a daily or weekly snapshot of a virtual machine. For example, snapshot 202 may represent a snapshot of a virtual machine from week 1, snapshot 204 from week 2, etc. Alternatively, the depicted snapshots 202-208 may represent daily snapshots. Each snapshot 202-208 includes data elements 210. Data elements 210 may refer to blocks of data that represent a section of a storage device. The hypervisor (or other host device manager) is configured to generate, via instructions from the backup manager 145, incremental backups of a virtual machine. The incremental backups are represented graphically as snapshots 202-208 having blocks of data elements 210 that may change from one snapshot to the next snapshot. A block of data element 210 that does not change from one snapshot to the next is represented by a cross-hatched block in FIG. 2. As depicted, from snapshot-1 202 to snapshot-2 204, data elements A, Y, and Z have not changed. As such, the snapshot-2 204 only maintains the data elements that have changed, or in other words, elements B', C', and X'. FIG. 2, therefore, is given only by way of example and is not intended to be limiting, but rather illustrative of one example of how data elements may change from a first snapshot 202 to a last snapshot 208. One will readily recognize that any number of snapshots 202-208 may be maintained by the virtualization manager 160.

The clone manager 175 is configured to collapse the snapshots into a virtual machine image 212. In the depicted embodiment, the clone manager 175 receives a clone request for a point-in-time represented by snapshot-3 206. The clone manager 175 may receive the clone request via a user-interface from a customer, or alternatively, the virtualization manager 160 may identify that a virtual machine is failing, and accordingly, be configured to launch a clone of the failing virtual machine based upon a last known functioning configuration.

The clone manager 175 instructs the hypervisor to collapse snapshot-1 202, snapshot-2 204, and snapshot-3 206 into the new virtual machine image 212. In one embodiment, the clone manager 175 performs the collapse. The collapse, described here briefly, combines the data elements 210 of each of the selected snapshots 214 into the new virtual machine 212 image in a manner that no longer includes incremental snapshot information (i.e., incremental, but separated partial images including data elements that have changed), but includes a complete virtual machine image. This is graphically illustrated as a summation of each of the data elements 210 of the different snapshots 202-206. In the example of a snapshot "chain," if snapshot-3 is the selected snapshot, the clone manager 175 combines the data elements of each snapshot beginning with the first snapshot, and proceeding through the chain to the selected snapshot.

In one embodiment, the metadata snapshots, which contain the configuration information of the virtual machine, may be collapsed from stored metadata snapshots in a manner similar to a collapsing of storage snapshots. The resulting metadata may be combined, by the clone manager 175, with the resulting storage snapshot into the new virtual machine 212 image.

Figure 3:
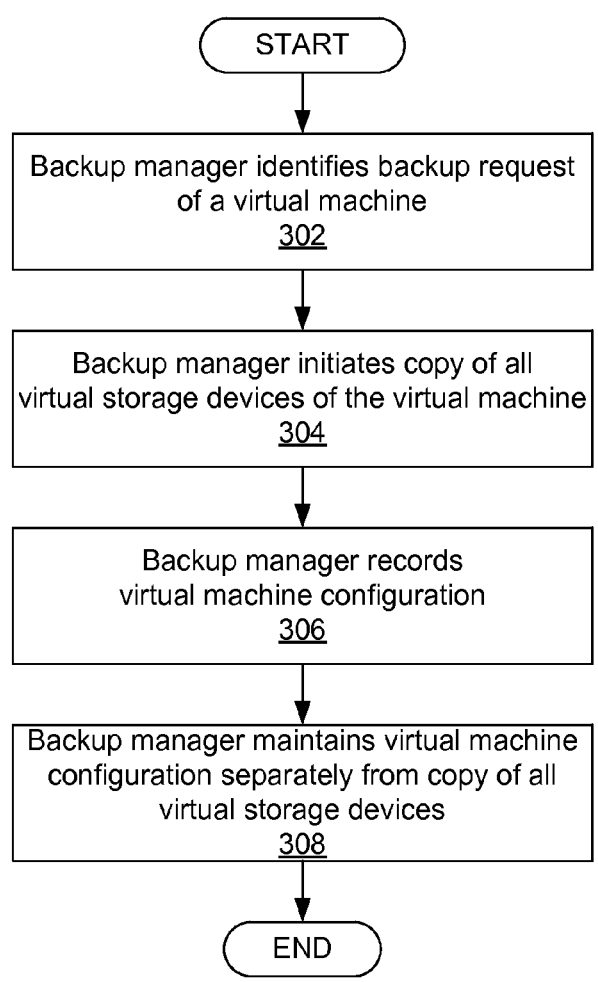
FIG. 3 is a flow diagram illustrating a method for initiating a backup of a virtual machine.

FIG. 3 is a flow diagram illustrating a method 300 for initiating a backup of a virtual machine. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the backup manager 145 of FIG. 1.

The method 300 starts and the processing logic, at block 302, identifies a backup request for a virtual machine. In one embodiment, the processing logic identifies a backup request by receiving a backup request from a user via a user interface. The user interface may be a graphical user interface (e.g., a website having virtual machine configuration information), or alternatively, a command line interface that allows the user to communicate with the virtual machine. In another embodiment, the processing logic identifies a backup request by interpreting a backup schedule. In other words, the processing logic may identify a backup request by identifying a backup schedule and initiating a backup according to the backup schedule. The backup schedule may request an hourly backup, or alternatively, the backup schedule may request a snapshot backup each time any software is modified in the virtual machine.

At block 304, the processing logic initiates a copy of the data contents of all virtual storage devices of the virtual machine. For example, the processing logic may be configured to instruct the hypervisor 124 to create a copy of each storage device in use by the virtual machine. In an alternative embodiment, the processing logic may perform the backup. The storage devices in use by the virtual machine may include, but are not limited to, virtual storage drives, virtual RAM, etc.

At block 306, the processing logic generates a snapshot of the metadata of the virtual machine. The processing logic may generate a snapshot of the metadata and insert, at block 308, the snapshot into the data store 170 separately from the backup snapshot of the storage devices as described above. In one implementation, the snapshot of the metadata is in an extensible markup language (XML) format. In a further implementation, the snapshot may be in an open virtualization format (OVF), which is an open standard for packaging and distributing virtual appliances and/or applications to be run in virtual appliances. For example, the snapshot may be packaged into an OVF package or an OVA package. Alternatively, the snapshot may be packaged into a virtual hard disk (VHD) file or a virtual machine disk (VMDK) file.

The processing logic may attach an identifier to the snapshot, such as a time stamp. The group of snapshots of metadata that correspond to a virtual machine may be "chained" to one another. As will be discussed below with reference to FIG. 3, each snapshot may be "chained' or linked to a previous snapshot and a subsequent snapshot. A snapshot, in one embodiment, is chained to a previous snapshot by creating a pointer, or other data type having a value that refers directly to the previous backup. As such, a user may travel forward and backward to preview snapshots. In another embodiment, the snapshots are maintained so as to be randomly accessible.

Figure 4:
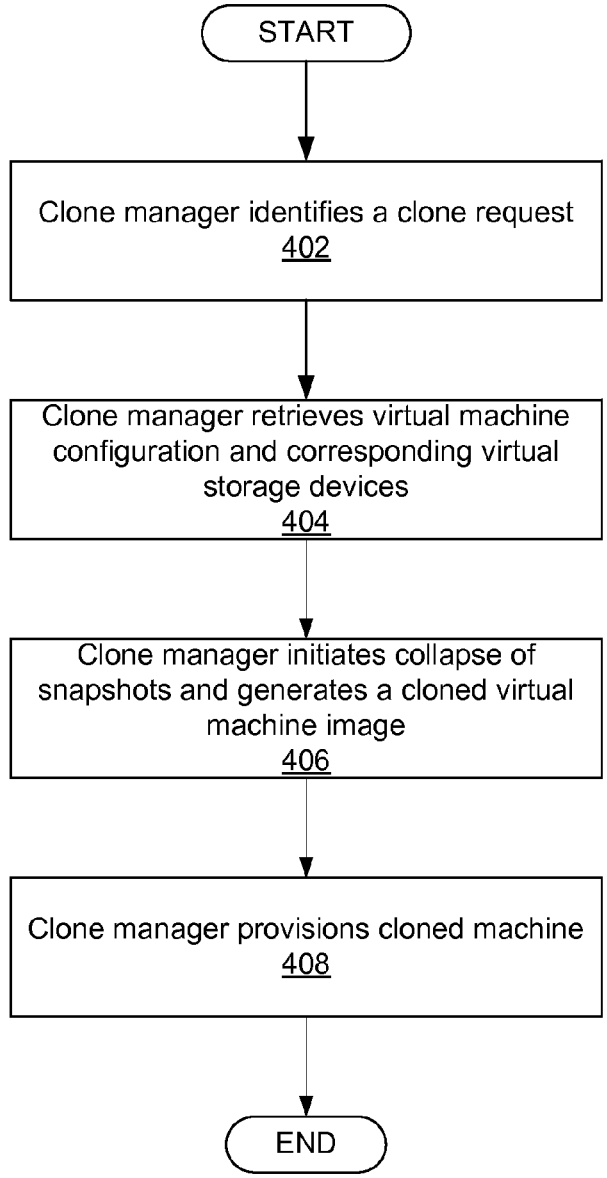
FIG. 4 is a flow diagram illustrating a method for cloning a virtual machine from a snapshot backup of a virtual machine.

FIG. 4 is a flow diagram illustrating a method 400 for cloning a virtual machine from a snapshot backup of a virtual machine. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the clone manager 175 of FIG. 1.

The method 400 starts, and the processing logic, at block 402, identifies a clone request. The processing logic, in one embodiment, identifies a clone request by receiving, via a user interface, a request from a user or client device to clone a virtual machine. In another embodiment the processing logic receives a clone request from the virtualization manager which may be configured to identify when a virtual machine has become unresponsive, for example.

At block 404, the processing logic retrieves the virtual machine configuration data (e.g., metadata) from the data store associated with the point-in-time selected for cloning. The processing logic, in one embodiment, is configured to retrieve a specific metadata snapshot (i.e., virtual machine configuration snapshot) from the data store based upon the clone request. The clone request may include a snapshot identifier, such as a time stamp. In another embodiment, the processing logic retrieves a most recent snapshot, or a snapshot of a last known functioning configuration. Similarly, the processing logic retrieves the storage snapshot (i.e., snapshot of storage devices used by the virtual machine) associated with the clone request.

At block 406, the processing logic performs a collapse of the snapshots. In one embodiment, the processing logic collapses both the metadata snapshot and the storage snapshot. In another embodiment, a single snapshot contains both storage information and configuration information. The processing logic performs a collapse as described above with reference to FIG. 2. The processing logic then generates a virtual machine image, without any snapshot information, based on the collapsed metadata and storage snapshots. At block 408, the processing logic provisions a new virtual machine based on the virtual machine image.

Figure 5:
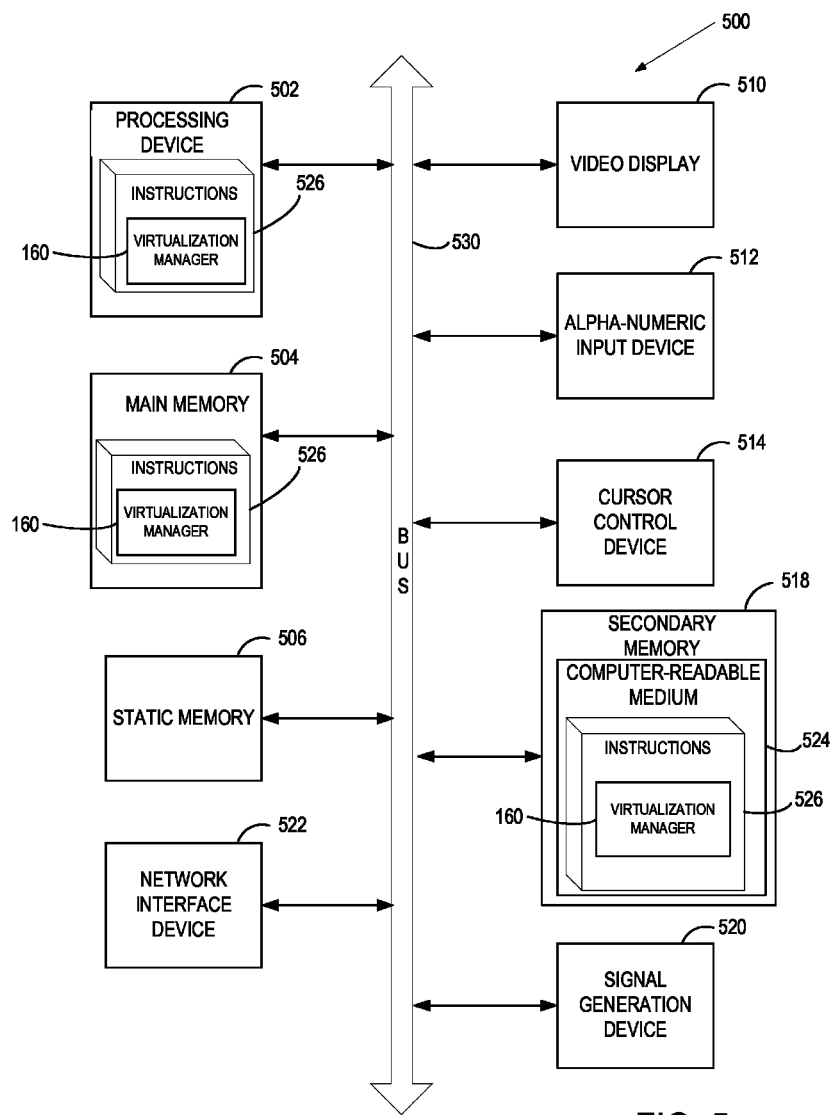
FIG. 5 is a diagram of one embodiment of a computer system for facilitating the provisioning of virtual machines.

FIG. 5 is a diagram of one embodiment of a computer system for facilitating the provisioning of virtual machines. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the virtualization manager 160. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "identifying," "receiving," "retrieving," "provisioning," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In the preceding description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a processing device a clone request for a virtual machine, the clone request comprising a point-in-time reference;
   retrieving a metadata snapshot in view of the point-in-time reference, wherein the metadata snapshot is one of a plurality of metadata snapshots forming a point-in-time chain of metadata snapshots, wherein each of the plurality of metadata snapshots comprises data elements that have changed from a previous metadata snapshot and references to preexisting data elements in one or more previous metadata snapshots;
   retrieving a storage snapshot in view of the point-in-time reference, wherein the storage snapshot is one of a plurality of incremental storage snapshots forming a point-in-time chain of incremental storage snapshots, wherein each of the plurality of incremental storage snapshots comprises data elements of one or more virtual storage devices used by the virtual machine that have changed from a previous storage snapshot and references to preexisting data elements in one or more previous storage snapshots;
   collapsing, by the processing device, the plurality of metadata snapshots into a single metadata image, the collapsing comprising writing each of the data elements from the metadata snapshot and the preexisting data elements from the one or more previous metadata snapshots into the single metadata image while discarding incremental snapshot information identifying which of the plurality of metadata snapshots each of the preexisting data elements is from;
   collapsing the plurality of incremental storage snapshots into a single storage image, the collapsing comprising writing each of the data elements from the storage snapshot and the preexisting data elements from the one or more previous storage snapshots into the single storage image while discarding incremental snapshot information identifying which of the plurality of storage snapshots each of the preexisting data elements is from;
   combining, by the processing device, the metadata image and the storage image into a virtual machine image; and
   provisioning a new virtual machine in view of the virtual machine image.

2. The method of claim 1, wherein the clone request further comprises an identifier indicative of a specific snapshot based upon a timestamp.

3. The method of claim 1, wherein the virtual machine comprises a virtual appliance comprising a preconfigured operating system environment and a single application.

4. The method of claim 1, wherein the virtual machine is a component of a composite application that comprises the virtual machine and one or more additional virtual machines.

5. A non-transitory computer-readable storage medium having instructions that, when executed by a processing device, cause the processing device to:
   identify, by the processing device, a clone request for a virtual machine, the clone request comprising a point-in-time reference;
   retrieve, by the processing device, a metadata snapshot in view of the point-in-time reference, wherein the metadata snapshot is one of a plurality of metadata snapshots forming a point-in-time chain of metadata snapshots, wherein each of the plurality of metadata snapshots comprises data elements that have changed from a previous metadata snapshot and references to preexisting data elements in one or more previous metadata snapshots;
   retrieve a storage snapshot in view of the point-in-time reference, wherein the storage snapshot is one of a plurality of incremental storage snapshots forming a point-in-time chain of incremental storage snapshots, wherein each of the plurality of incremental storage snapshots comprises data elements of one or more virtual storage devices used by the virtual machine that have changed from a previous storage snapshot and references to preexisting data elements in one or more previous storage snapshots;
   collapse, by the processing device, the plurality of metadata snapshots into a single metadata image, the collapsing comprising writing each of the data elements from the metadata snapshot and the preexisting data elements from the one or more previous metadata snapshots into the single metadata image while discarding incremental snapshot information identifying which of the plurality of metadata snapshots each of the preexisting data elements is from;
   collapse the plurality of incremental storage snapshots into a single storage image, the collapsing comprising writing each of the data elements from the storage snapshot and the preexisting data elements from the one or more previous storage snapshots into the single storage image while discarding incremental snapshot information identifying which of the plurality of storage snapshots each of the preexisting data elements is from;
   combine the metadata image and the storage image into a virtual machine image; and
   provision a new virtual machine in view of the virtual machine image.

6. The non-transitory computer-readable medium of claim 5, wherein the clone request further comprises an identifier indicative of a specific snapshot based upon a timestamp.

7. The non-transitory computer-readable storage medium of claim 5, wherein the virtual machine comprises a virtual appliance comprising a preconfigured operating system environment and a single application.

8. A computing apparatus comprising:
   a memory; and a processing device coupled to the memory, wherein the processing device is to:
identify a clone request for a virtual machine, the clone request comprising a point-in-time reference;
retrieve a metadata snapshot in view of the point-in-time reference, wherein the metadata snapshot is one of a plurality of metadata snapshots forming a point-in-time chain of metadata snapshots, wherein each of the plurality of metadata snapshots comprises data elements that have changed from a previous metadata snapshot and references to preexisting data elements in one or more previous metadata snapshots;
retrieve a storage snapshot in view of the point-in-time reference, wherein the storage snapshot is one of a plurality of incremental storage snapshots forming a point-in-time chain of incremental storage snapshots, wherein each of the plurality of incremental storage snapshots comprises data elements of one or more virtual storage devices used by the virtual machine that have changed from a previous storage snapshot and references to preexisting data elements in one or more previous storage snapshots;
collapse the plurality of metadata snapshots into a single metadata image, the collapsing comprising writing each of the data elements from the metadata snapshot and the preexisting data elements from the one or more previous metadata snapshots into the single metadata image while discarding incremental snapshot information identifying which of the plurality of metadata snapshots each of the preexisting data elements is from;
collapse the plurality of incremental storage snapshots into a single storage image, the collapsing comprising writing each of the data elements from the storage snapshot and the preexisting data elements from the one or more previous storage snapshots into the single storage image while discarding incremental snapshot information identifying which of the plurality of storage snapshots each of the preexisting data elements is from;
combine the metadata image and the storage image into a virtual machine image; and
provision a new virtual machine in view of the virtual machine image.

9. The computing apparatus of claim 8, wherein the clone request further comprises an identifier indicative of a specific snapshot based upon a timestamp.

10. The computing apparatus of claim 8, wherein the virtual machine is a component of a composite application that comprises the virtual machine and one or more additional virtual machines.

11. The computing apparatus of claim 8, wherein the virtual machine comprises a virtual appliance comprising a preconfigured operating system environment and a single application.

12. The computing apparatus of claim 8, wherein the virtual machine is a component of a composite application that comprises the virtual machine and one or more additional virtual machines.

* * * * *